(12) United States Patent
Kohn et al.

(10) Patent No.: US 8,493,454 B1
(45) Date of Patent: Jul. 23, 2013

(54) SYSTEM FOR CAMERA MOTION COMPENSATION

(75) Inventors: Leslie D. Kohn, Saratoga, CA (US); Kamil Metin Uz, Palo Alto, CA (US)

(73) Assignee: Ambarella, Inc., Santa Clara, CA (US)

( * ) Notice: Subject to any disclaimer, the term of this patent is extended or adjusted under 35 U.S.C. 154(b) by 507 days.

(21) Appl. No.: 12/707,174

(22) Filed: Feb. 17, 2010

(51) Int. Cl.
*H04N 5/228* (2006.01)
(52) U.S. Cl.
USPC ............... 348/208.6; 348/208.2; 348/208.4
(58) Field of Classification Search
None
See application file for complete search history.

(56) References Cited

U.S. PATENT DOCUMENTS

| 6,211,913 | B1 * | 4/2001 | Hansen et al. | 348/239 |
| 7,180,045 | B2 * | 2/2007 | Anderson | 250/208.1 |
| 2006/0109353 | A1 * | 5/2006 | Hayashi | 348/231.3 |
| 2006/0251409 | A1 * | 11/2006 | Tabuchi et al. | 396/52 |
| 2008/0166115 | A1 * | 7/2008 | Sachs et al. | 396/55 |
| 2010/0188503 | A1 * | 7/2010 | Tsai et al. | 348/142 |
| 2010/0277603 | A1 * | 11/2010 | Tsai | 348/208.4 |

* cited by examiner

*Primary Examiner* — Luong T Nguyen
(74) *Attorney, Agent, or Firm* — Christopher P. Maiorana, PC

(57) ABSTRACT

An apparatus including one or more motion sensors, a first circuit, and a second circuit. The one or more motion sensors may be configured to generate motion samples representing motion of a camera. The first circuit may be configured to record a plurality of the motion samples from the one or more motion sensors while capturing image data with the camera. The second circuit may be configured to transfer information about the motion of the camera based on the plurality of motion samples. The information about the motion of the camera may be transferred within a bitstream carrying the image data captured by the camera.

19 Claims, 8 Drawing Sheets

SYSTEM FOR CAMERA MOTION COMPENSATION

FIELD OF THE INVENTION

The present invention relates to a method and/or architecture for digital video coding generally and, more particularly, to a method and/or architecture for camera motion compensation.

BACKGROUND OF THE INVENTION

Referring to FIG. 1, a diagram is shown illustrating components of a conventional handheld digital camera 10. The handheld camera 10 is often subject to unintended motion during recording. The unintended motion can be measured, for instance, using gyroscopic or inertial sensors 12. In conventional camcorders, rotation around horizontal and vertical axes is measured by two gyroscopic sensors (gyros) 12. The unintended motion can be partially corrected by the camcorder. One conventional approach for correcting camera motion is to use Optical Image Stabilization (OIS). An OIS system uses the motion information from the gyros 12 to move a lens 14 or an image sensor 16 in order to compensate for the camera motion.

Referring to FIG. 2, a diagram is shown illustrating an example of Electronic Image Stabilization (EIS). Another conventional approach for correcting camera motion is to use Electronic Image Stabilization (EIS). A camera using EIS acquires a larger image 20, then selects a smaller window 22 (i.e., a crop window) such that the image in the crop window 22 appears to be stabilized. The smaller crop window 22 can be defined by parameters including a vertical offset, a horizontal offset, a crop width, and a crop height.

The processing of the conventional motion compensation approaches is subject to practical constraints because the processing is done in real-time (i.e., while acquiring the image). In OIS, there are physical limitations in moving the lens 14 or sensor 16 far enough or fast enough to completely correct for the unintended motion. Similarly, the conventional EIS system relies on capturing the larger image 20 from which the stabilized window 22 can be obtained, and therefore is also limited in correction range. Furthermore, it can be difficult to differentiate an unintended hand motion from a deliberate one, such as in panning.

It would be desirable to have a method and/or apparatus for camera motion compensation that allows better decisions to be made and/or more sophisticated processing than is possible in real-time, either during playback or for re-encoding.

SUMMARY OF THE INVENTION

The present invention concerns an apparatus including one or more motion sensors, a first circuit, and a second circuit. The one or more motion sensors may be configured to generate motion samples representing motion of a camera. The first circuit may be configured to record a plurality of the motion samples from the one or more motion sensors while capturing image data with the camera. The second circuit may be configured to transfer information about the motion of the camera based on the plurality of motion samples. The information about the motion of the camera may be transferred within a bitstream carrying the image data captured by the camera.

The objects, features and advantages of the present invention include providing a method and/or architecture for camera motion compensation that may (i) carry original motion information along with video data in an output bitstream from a camera, (ii) embed information about both original motion and any correction(s) performed by the camera in the output bitstream, (iii) allow more sophisticated processing to be performed during playback, (iv) allow more sophisticated processing to be performed for re-encoding, (v) improve image quality during playback, and/or (v) allow better decisions to be made with regard to image stabilization when the video content is re-encoded.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
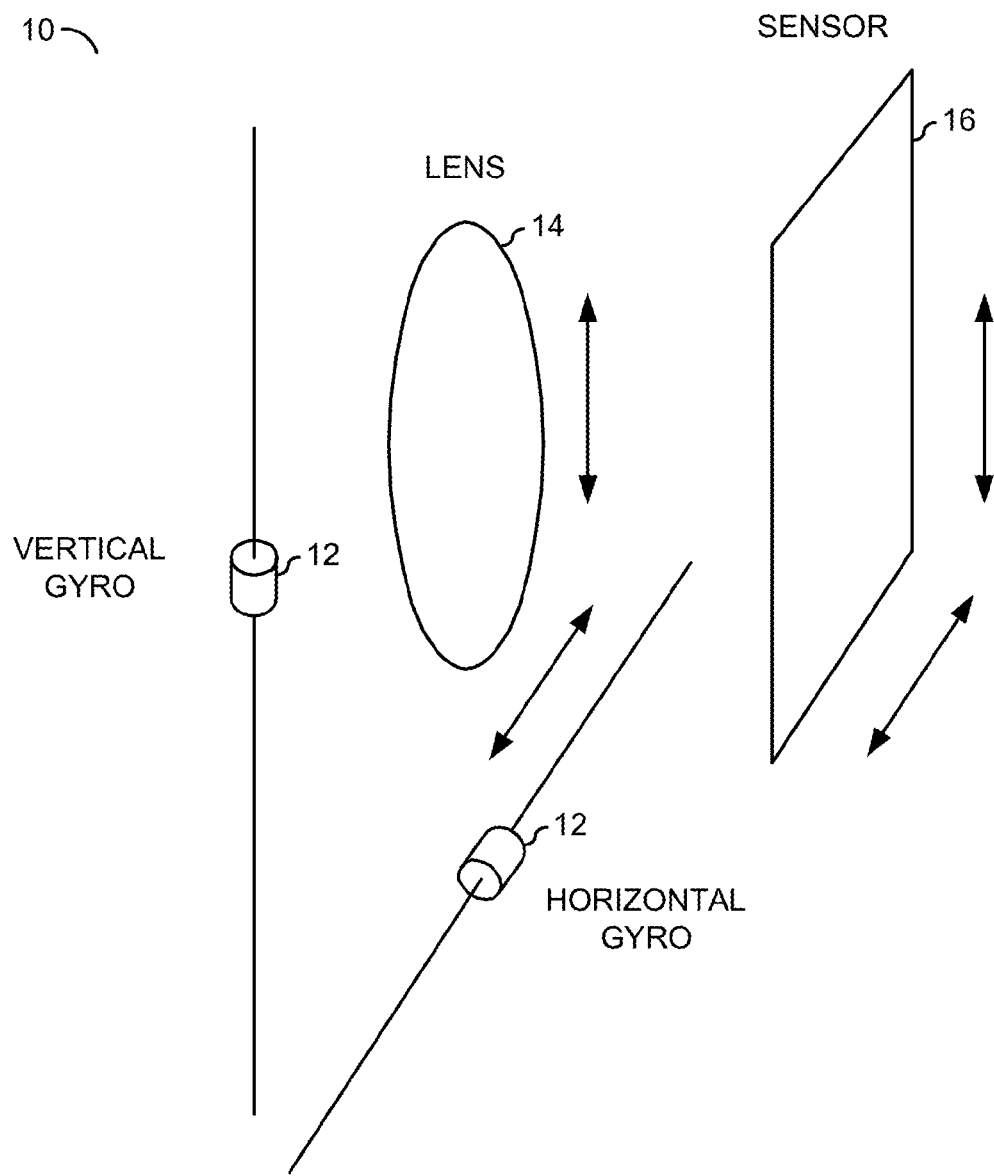
FIG. 1 is a diagram illustrating an example digital camera.
Figure 2:
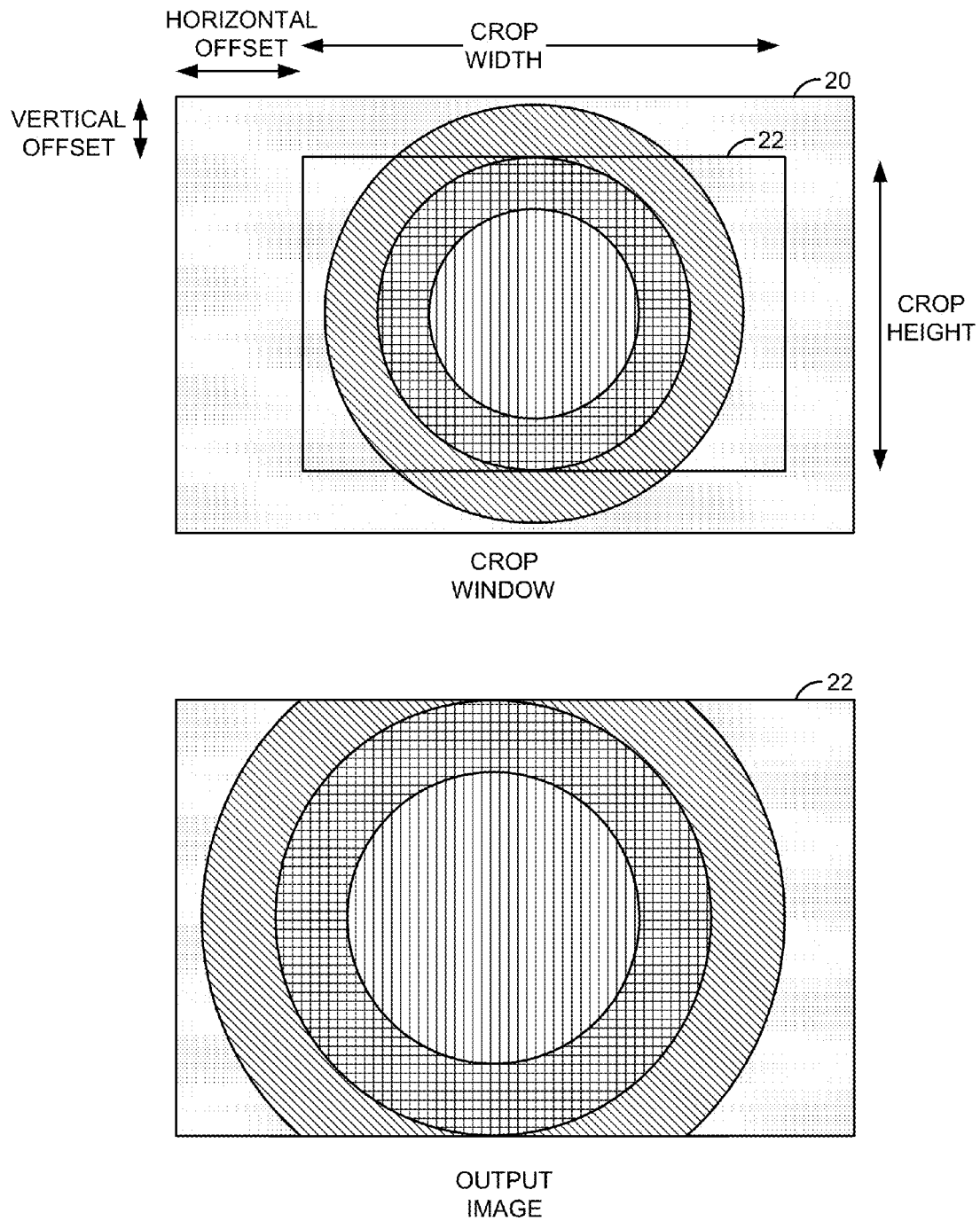
FIG. 2 is a diagram illustrating an example of electronic image stabilization.
Figure 3:
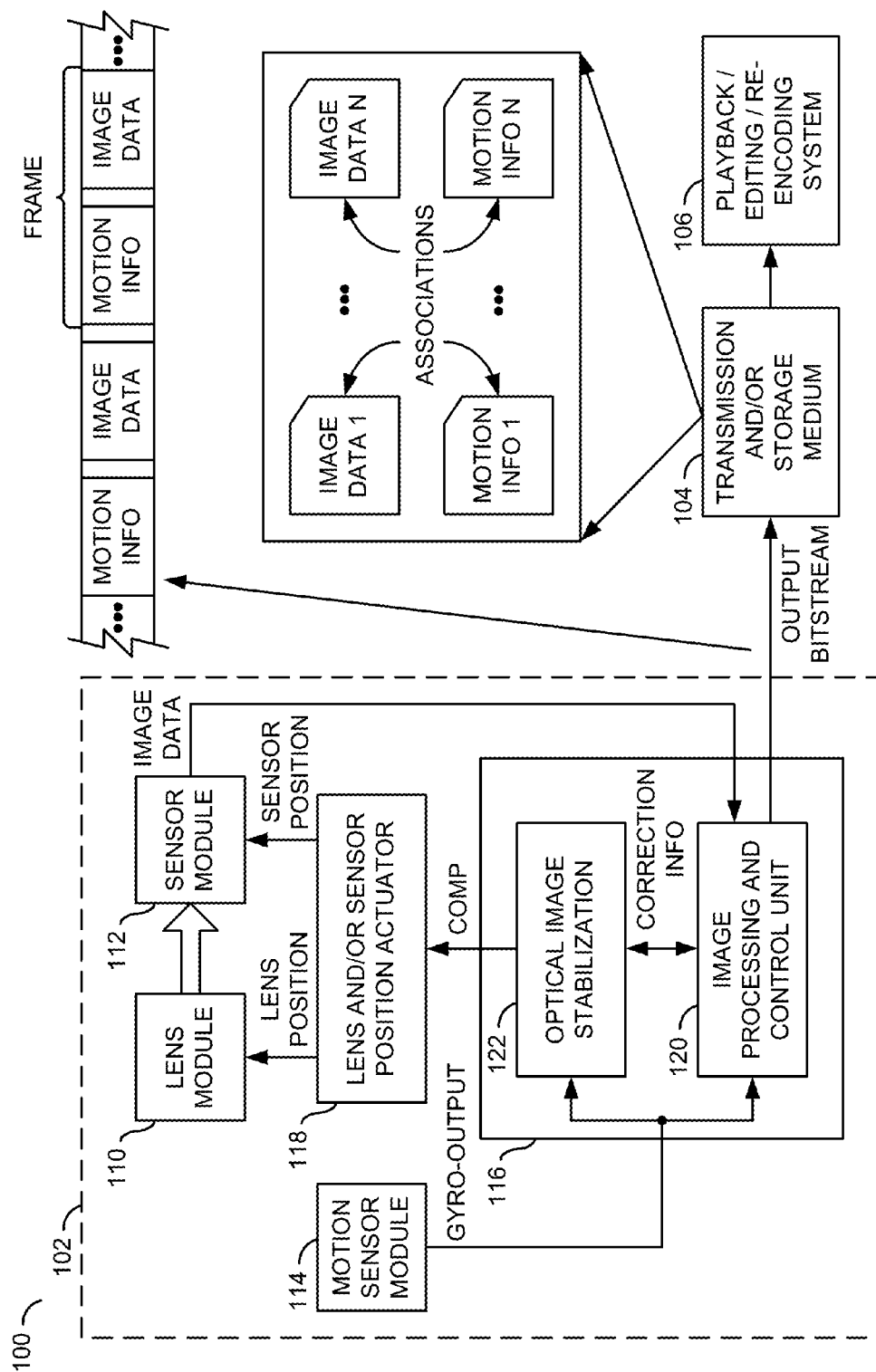
FIG. 3 is a block diagram illustrating an example system in accordance with a preferred embodiment of the present invention.

Referring to FIG. 3, a diagram is shown illustrating an example system 100 in accordance with various embodiments of the present invention. The system 100 may include, in one example, a camera 102, a transmission and/or storage medium 104 and a playback/editing/re-encoding system 106. In one example, the transmission and/or storage medium 104 may be implemented as part of one or both of the camera 102 and the system 106. In one example, the transmission and/or storage medium 104 may include, but is not limited to, memory devices, magnetic media, optical media, FLASH, or any other medium that may be used to store information for later use. In another example, the transmission and/or storage medium 104 may comprise a cable (e.g., USB, Fire-wire, Ethernet, Serial, Parallel, etc.) or a wireless link/protocol (e.g., infrared, RF, Bluetooth, Wi-Fi, etc.). The camera 102 may be configured to convert visual images (e.g., still and/or moving pictures) into an electronic form (e.g., image data).

The camera 102 may have an output that may present an output signal (e.g., OUTPUT BITSTREAM). The signal OUTPUT BITSTREAM may comprise both image data acquired by the camera 102 and information about the motion of the camera 102 while the image data was being acquired. The camera 102 may be configured to encode the image data and/or motion information using one or more standard or proprietary compression schemes (e.g., JPEG, MPEG, H.263, H.264, etc.). In one example, the motion information for each frame may be encapsulated with the respective frame. In another example, the motion information for a frame may be encapsulated with a following frame (e.g., one or more frames later in the bitstream). In one example, the output bitstream may comprise individual files that may be retrieved (extracted, read, etc.) from the camera by the system 106. In another example, the output bitstream may comprise individual files that may be transmitted by the camera 102 to the system 106. In one example, the motion information may be recorded in a separate file from the corresponding image information. The separate files may be associated with one another using, for example, references (or links) either stored in each of the files or in a separate link table, similar filenames, tags, etc.

In one example, the camera 102 may comprise a lens module 110, an image sensor 112, a motion sensor module 114, and an image processing and control module 116. When the camera 102 is configured to use Optical Image Stabilization (OIS), the camera 102 may also include, in one example, a lens and/or sensor position actuator module 118. The lens module 110, the image sensor 112, and the motion sensor module 114 may be implemented using conventional techniques.

The lens module 110 may be controlled to focus an image on the image sensor 112. The image sensor 112 may be configured to generate electronic image data in response to the image focused thereon by the lens module 110. In one example, the image sensor 112 may be implemented as a CMOS sensor. However, other image sensor types (e.g., CCD, etc.) may be implemented accordingly to meet the design criteria of a particular application.

The motion sensor module 114 may be configured to measure motion of the camera 102. The motion sensor module may comprise one or more gyroscopic and/or inertial sensors. In one example, the motion sensor module may comprise two gyroscopic sensors (e.g., first and second gyros) configured to measure rotation around horizontal and vertical axes, respectively. The motion sensor module 114 may have an output that may present one or more signals (e.g., GYRO_OUTPUT). Raw data recorded from the motion sensor module 114 may be pre-processed before being used for image stabilization. In one example, each individual sensor in the motion sensor module 114 may measure the angular velocity of the camera 102 about a corresponding axis. The angular velocity may be converted to linear velocity by scaling with the focal length of the lens 110. Based upon the discrete motion samples, the velocity may be interpolated so that an estimate is available at each line of data for an acquired image. In one example, interpolation may be performed on the angular velocity prior to the conversion to linear velocity. In another example, interpolation may be performed after the conversion to linear velocity. The interpolation may be performed using conventional techniques.

The image processing and control module 116 may have a first input that may receive the signal GYRO_OUTPUT, a second input that may receive a signal (e.g., IMAGE DATA) from the image sensor 112, and a first output that may present the signal OUTPUT BITSTREAM. The module 116 may also have a second output that may present a signal (e.g., COMP) that may be used to control the position actuator 118. The position actuator 118 may be configured as part of an OIS system of the camera 102 to control the position of one or both of the lens 110 and the image sensor 112 based upon the signal COMP. The position actuator 118 may be implemented using conventional techniques.

The image processing and control module 116 may be configured to produce the signal OUTPUT BITSTREAM containing both image data and information about the motion of the camera 102. The information about the camera motion may be generated based upon motion samples recorded from the motion sensors of the motion sensor module 114. In one example, the image processing and control module 116 may be configured to use JPEG encoding for still images, and H.264 or MPEG encoding for moving images, or video. However, other encoding schemes may be implemented accordingly to meet the design criteria of a particular implementation. The information about the camera motion generated by the image processing and control module 116 is generally different (separate) from motion estimation information (e.g., motion vectors, etc.) used in the encoding of moving images.

In one example, the image processing and control module 116 may comprise an image processing and control unit 120 and an Optical Image Stabilization unit 122. The image processing and control unit 120 may have a first input that may receive the signal GYRO_OUTPUT, a second input that may receive the signal IMAGE DATA, and an output that may present the signal OUTPUT BITSTREAM. The image processing and control unit 120 may also have an input/output that may present or receive a signal (e.g., CORRECTION INFO). In one example, the signal CORRECTION INFO may comprise information being communicated to the Optical Image Stabilization module 122 about motion correction to be performed by the camera 102 (e.g., via the position actuator 118). In another example, the signal CORRECTION INFO may comprise information being communicated to the image processing and control unit 120 about motion correction performed by the Optical Image Stabilization module 122 while acquiring the image data received by the image processing and control unit 120 via the signal IMAGE DATA. Alternatively, the Optical Image Stabilization module 122 may directly receive motion information from the motion sensor module 114 and use the signal GYRO_OUTPUT to control the lens module 110 and/or the image sensor 112.

The image processing and control unit 120 may be configured to produce the signal OUTPUT BITSTREAM containing both image data and information about the motion of the camera 102. The information about the camera motion may include information generated based upon motion samples recorded from the motion sensors of the motion sensor module 114 and information about corrective actions (e.g., OIS, EIS, etc.) taken by the camera to improve the quality of the image data.

The sensor outputs from the motion sensor module 114 may be read by the image processing and control unit 120 one or more times per frame. A plurality of motion samples is generally desirable, because the motion of the camera may change rapidly and accurate motion information may be critical for good compensation. In one example, the image processing and control unit 120 may be configured to use JPEG encoding for still images, and H.264 or MPEG encoding for moving images, or video. However, other encoding schemes may be implemented accordingly to meet the design criteria of a particular implementation. The information about the camera motion generated by the image processing and control unit 120 is generally different (separate) from motion estimation information (e.g., motion vectors, etc.) used in the encoding of moving images.

The module 106 may be implemented, for example, as a dedicated playback, editing, and/or re-encoding system, or a general purpose computer (e.g., IBM, DELL, HP, etc.) running application software configured to perform the various functions involved in playback, editing, and/or re-encoding of the output bitstream. Whether the module 106 is implemented as a dedicated system or an appropriately programmed computer, the module 106 may be configured to retrieve and utilize both the image data and the information about the motion of the camera contained in the signal OUTPUT BITSTREAM.

The system 106 is generally configured to perform camera motion compensation based upon the motion information contained in the signal OUTPUT BITSTREAM. The system 106 may make better decisions and/or perform more sophisticated processing than is possible in real-time, either during playback or for re-encoding, because motion information about future camera motion is generally available to the system 106 when a particular frame is being processed.

The motion information encapsulated in each encoded video frame may include, but is not limited to, motion information (e.g., all or a subset of horizontal and vertical motion samples acquired during the frame time), crop window parameters (if applicable), residual motion information (e.g., uncorrected motion, or motion still left in the captured stream), exposure time, and/or focal distance of the lens. In general, recording a plurality of motion samples is preferable. In one example, at least eight motion sample should be acquired during the frame time.

In one example, the motion information may comprise horizontal and vertical motion information. The horizontal and vertical motion information may be converted from angular motion into linear motion. The linear motion may be scaled by the picture size to obtain units that are percentage of picture width or height per frame time. Scaling the linear motion by the picture size ensures that the data remains relevant even if the picture is resized later. All or a downsampled subset of samples acquired during the frame time may be included. Having at least eight samples per frame is preferable to improve the accuracy of the image correction.

In one example, the motion information encapsulated in the bitstream may include a crop window parameters field. The crop window parameters field is generally applicable for EIS. The crop window parameters field generally identifies the crop window used to obtain the encoded frame. For example, the crop window parameters field may include the original image size, horizontal and vertical offsets, and the crop window size.

In another example, the motion information encapsulated in the bitstream may include residual motion information. It may not always be possible to completely correct for the measured motion. For example, in the case of OIS, there may be limits on the actuator speed or range, or the physical inertia may be a constraint. In the case of EIS, the hardware may have constraints on correcting the rolling shutter effect. The residual motion information may be similar to the original motion information, except that the residual motion information may indicate the motion that was not corrected by the camera.

In yet another example, the motion information encapsulated in the bitstream may include a field for exposure time. For best results, the exposure time of each line should be recorded, because the effect of the camera motion may be integrated by the sensor during the exposure window. Exposure timing may vary according to the camera mode or exposure requirements.

The motion information encapsulated in the bitstream may also include a field for recording the focal distance of the lens 110 of the camera 102. The focal distance information may be used to obtain an indication of the raw angular velocity, when the motion information has already been converted to linear velocity. The focal distance information may be used, for example, to adjust parameters for detecting a panning motion or gesture.

The motion information encapsulated in the bitstream may be used, for example, in detecting gyro parameter drift, improving image stabilization, and/or improving rolling shutter distortion. The response of a gyro may change based on external factors such as temperature or severity of the motion. While it is hard to detect a drift in a sensor gain, it may be possible to detect a drift in the zero position. Long-term averages of the angular velocity may be expected to be zero in the case of hand motion. The detection of gyro parameter drift may be used to correct for a slow drift in a zero point of a sensor.

The motion information encapsulated in the bitstream may be used, for example, in improving image stabilization. Both OIS and EIS generally involve some trade-offs due to inability to look ahead into future motion. For example, when an operator starts a horizontal pan, the camera motion may initially look like an unintended hand motion, and be corrected. When the motion persists for some time, the motion may then be treated as a pan. By looking at future motion information, a user may more accurately differentiate intended versus unintended motion, and therefore have more natural output. In addition, the range of the motion correction and associated amount of cropping used may be optimized based on knowledge of the motion over an extended period of time (e.g., several seconds).

The motion information encapsulated in the bitstream may be used, for example, in improving Rolling Shutter Distortion. Residual motion information may be used to determine whether further processing is needed to improve rolling shutter distortion. The motion information used by the camera is generally the difference between raw motion information, and residual motion information. Additional correction may be performed during playback, or in a separate pass with re-encoding.

The motion information encapsulated in a bitstream in accordance with the present invention may be contrasted to post-processing. If the bitstream has no motion information, the bitstream may be processed offline in an attempt to recreate motion information for each frame. However, there are advantages to using the bitstream embedded information instead of, or in addition to such post-facto information. For example, it is much easier to read the embedded information from the bitstream instead of processing the entire sequence to recreate motion information. The motion information encapsulated in the bitstream in accordance with the present invention allows immediate playback of the bitstream instead of waiting for the post-processing to finish. In some cases, it may be difficult using post-processing to identify and correct the camera motion (e.g., when there are multiple moving subjects in the video).

Figure 4:
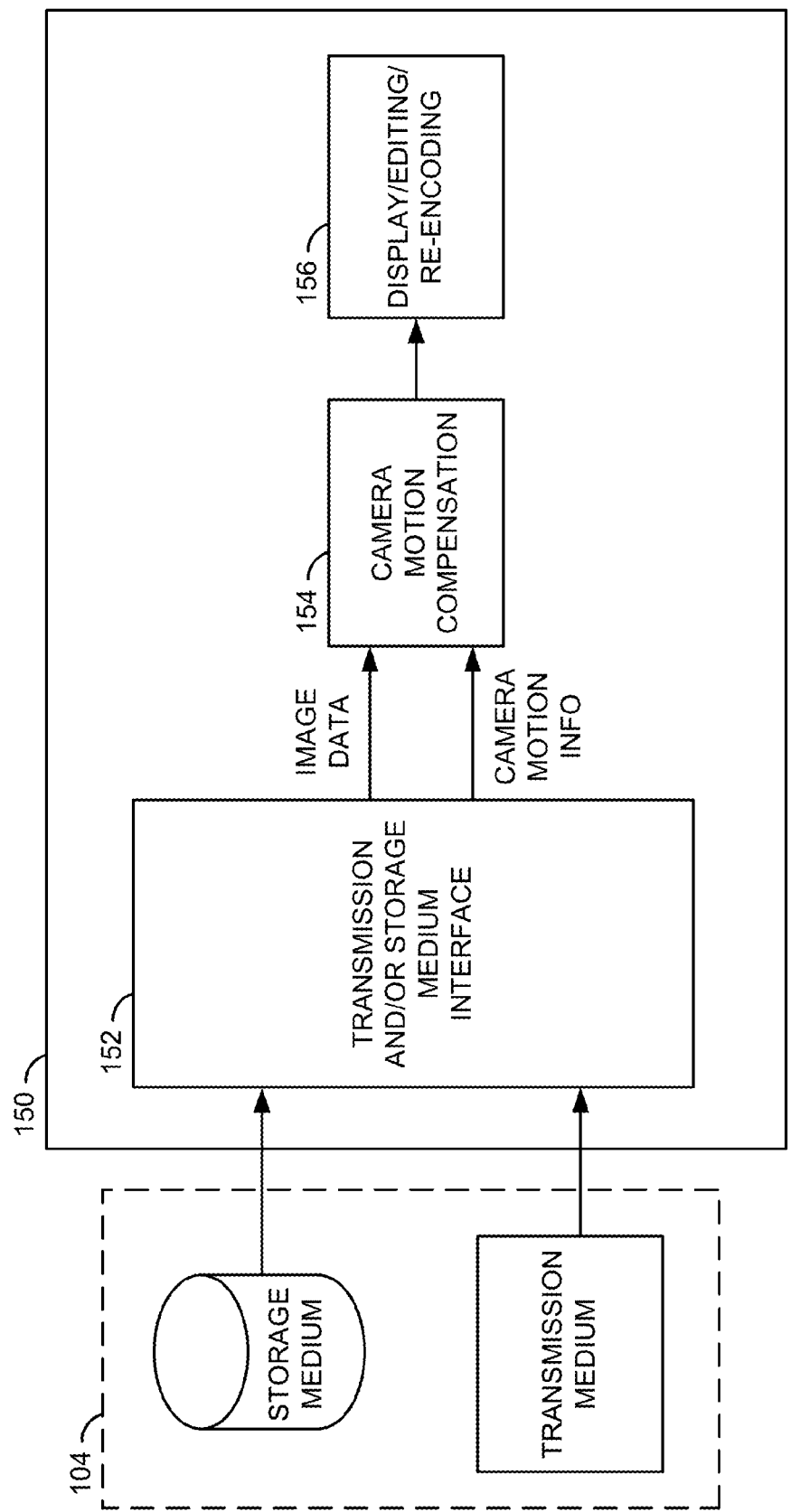
FIG. 4 is a block diagram illustrating an example of a playback/editing/re-encoding module of FIG. 3.

Referring to FIG. 4, a block diagram is shown illustrating an example playback/editing/re-encoding module 150 in accordance with the present invention. In one example, the playback/editing/re-encoding system 106 may be implemented using the module 150. The module 150 may be implemented, for example, as any device such as a camera, any playback device, including a personal computer, an editing system, a transcoder, etc., that decodes a bitstream transporting image data. The module 150 generally has no direct role in acquiring information about camera motion, but may be configured to use information about camera motion contained in the bitstream to improve playback quality, make better decisions, and/or perform more sophisticated processing than is possible in real-time, either during playback or for re-encoding, because information about future motion is available.

In one example, the module 150 may comprises a module (or circuit) 152, a module (or circuit) 154, and a module (or circuit) 156. The module 152 may comprise a transmission and/or storage medium interface. The module 154 may comprises a camera motion compensation module. The module 156 may comprises a display, editing, and/or re-encoding module. In one example, the module 152 may be configured to decode a bitstream received from the transmission/storage medium 104. For example, the module 152 may be implemented with appropriate parsing and decoding modules for whatever encoding system was used in creating the bitstream. In another example, the module 152 may be implemented as a direct memory access (DMA) controller, FLASH interface, Smart media interface, USB interface, disc interface, etc. for accessing a storage medium containing files created in accordance with the present invention.

Regardless of the implementation used for the module 152, the module 152 generally presents a image data at a first output and information about motion of a camera corresponding with the image data at a second output. The module 154 generally receives the image data and the camera motion information from the module 152 and performs camera motion compensation on the image data using the camera motion information. For example, the module 154 may use the camera motion information to correct a rolling shutter effect (described below in connection with FIGS. 6 and 7). The module 154 may have an output that may present the compensated image data.

The module 156 may have an input that may receive the compensated image data. The module 156 may be configured to display the compensated image data, allow a user to edit the compensated image data, and/or re-encode the compensated image data. In one example, the module 156 may be configured to interact with the module 154 to control how the camera motion information is used in performing camera motion compensation on the image data. For example, the module 156 may alter the motion compensation performed by the module 154 on a current frame based on camera motion information from a future frame. For example, compensation of a panning motion as an unintentional hand motion may be avoided.

Figure 5:
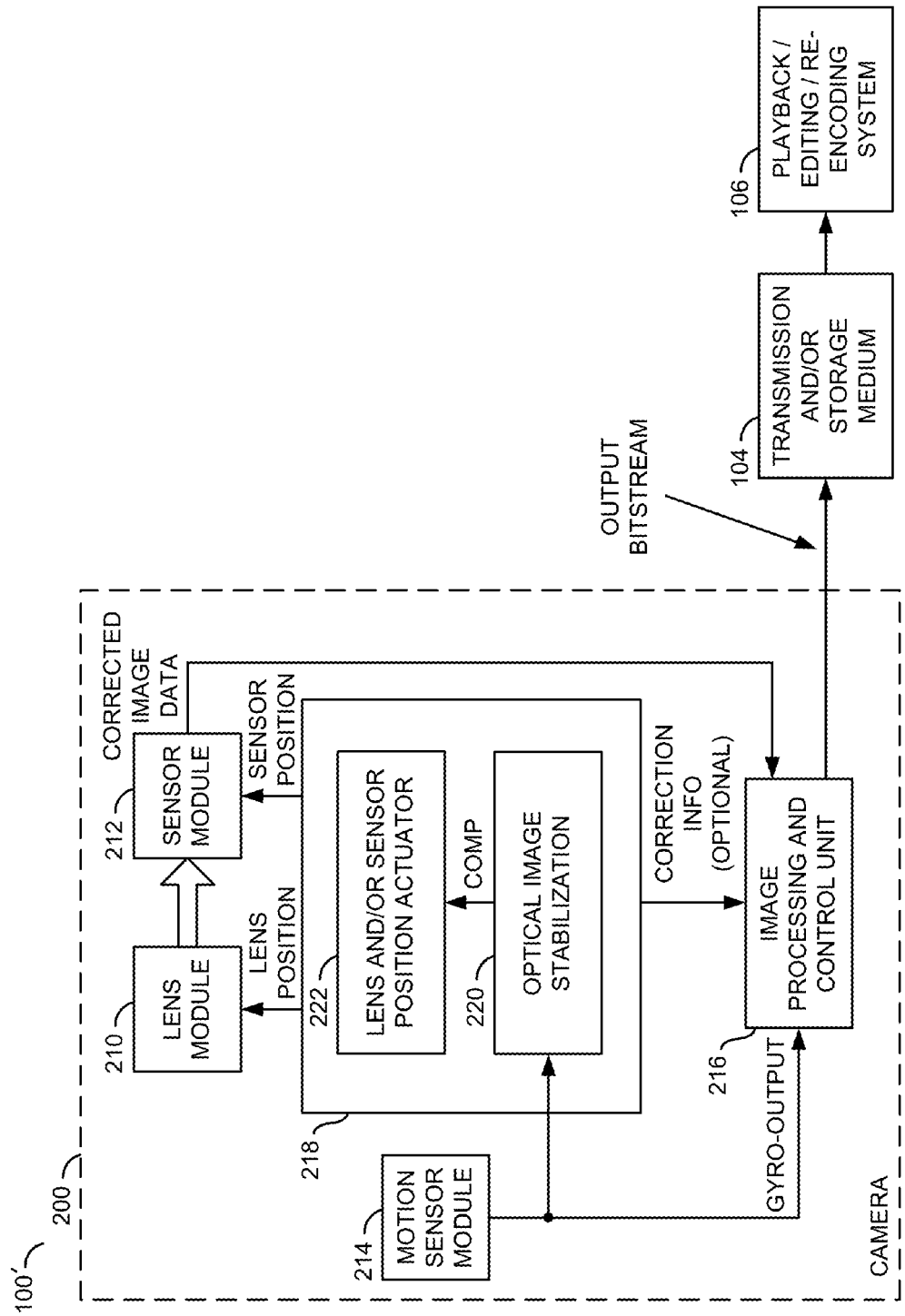
FIG. 5 is a block diagram illustrating another example system in accordance with the present invention.

Referring to FIG. 5, a diagram is shown illustrating another example system 100' implemented in accordance with the present invention. In one example, the system 100' may be implemented with a camera 200. The camera 200 may comprise a lens module 210, an image sensor 212, a motion sensor module 214, an image processing and control module 216, and an Optical Image Stabilization (OIS) module 218. The OIS module 218 may be self-contained or autonomous. Because the camera 200 includes a self-contained or autonomous OIS module 218, the remainder of the system generally receives optically compensated image data along with motion information. The motion information may or may not include information about any correction(s) made by the OIS module 218. However, further motion correction of the image data may still be possible using the motion information encapsulated in the bitstream with the image data. The lens module 210, the image sensor 212, the motion sensor module 214, and the OIS module 218 may be implemented using conventional techniques.

The lens module 210 may be controlled to focus an image on the image sensor 212. The image sensor 212 may be configured to generate electronic image data in response to the image focused thereon by the lens module 210. In one example, the sensor 212 may be implemented as a CMOS sensor. However, other image sensor types (e.g., CCD, etc.) may be implemented accordingly to meet the design criteria of a particular application.

The motion sensor module 214 may be configured to measure motion of the camera 200. The motion sensor module 214 may comprise one or more gyroscopic and/or inertial sensors. In one example, the motion sensor module 214 may comprise two gyroscopic sensors (e.g., first and second gyros) configured to measure rotation around horizontal and vertical axes, respectively. The motion sensor module 214 may have an output that may present the one or more signals GYRO_OUTPUT. Raw data recorded from the motion sensor module 214 may be pre-processed before being used for image stabilization. In one example, each individual sensor in the motion sensor module 214 may measure the angular velocity of the camera 200 about a corresponding axis. The angular velocity may be converted to linear velocity by scaling with the focal length of the lens 210. Based upon the discrete motion samples, the velocity may be interpolated so that an estimate is available at each line of data for an acquired image. In one example, interpolation may be performed on the angular velocity prior to the conversion to linear velocity. In another example, interpolation may be performed after the conversion to linear velocity. The interpolation may be performed using conventional techniques.

The image processing and control module 216 may have a first input that may receive the signal GYRO_OUTPUT, a second input that may receive a signal (e.g., CORRECTED IMAGE DATA) from the image sensor 212, and a first output that may present the signal OUTPUT BITSTREAM. The module 216 may also have an optional third input that may receive a signal (e.g., CORRECTION INFO) that may comprise information about motion correction made by the OIS module 218.

The OIS module 218 may have a first input that may receive the signal GYRO_OUTPUT, a first output that may present a signal (e.g., LENS POSITION), a second output that may present a signal (e.g., SENSOR POSITION), and an optional third output that may present the signal CORRECTION INFO. The signal LENS POSITION may represent the position of the lens 210. The signal SENSOR POSITION may represent the position of the image sensor 212. The OIS module 218 may control the positions of the lens module 210 and the image sensor module 212 based upon the signal GYRO_OUTPUT.

In one example, the OIS module 218 may comprise an optical image stabilization block 220 and a lens and/or sensor position actuator module 222. The lens and/or sensor position actuator module 222 may be configured as part of the OIS system of the camera 100' to control the position of one or both of the lens 210 and the image sensor 212 based upon the signal GYRO_OUTPUT. The position actuator 222 may be implemented using conventional techniques.

In one example, the image processing and control unit 216 may be configured to produce the signal OUTPUT BITSTREAM containing both corrected image data and information about the motion of the camera 100'. In another example, the image processing and control unit 216 may be configured to produce the signal OUTPUT BITSTREAM further containing information about correction(s) made by the OIS module 218. The information about the camera motion may be generated based upon motion samples recorded from the motion sensors of the motion sensor module 214. In one example, the image processing and control unit 216 may be configured to use JPEG encoding for still images, and H.264 or MPEG encoding for moving images, or video. However, other encoding schemes may be implemented accordingly to meet the design criteria of a particular implementation. The information about the camera motion generated by the image processing and control module 216 is generally different (separate) from motion estimation information (e.g., motion vectors, etc.) used in the encoding of moving images. In one example, the motion information encapsulated in the signal OUTPUT BITSTREAM may comprise residual motion information. For example, the motion information encapsulated in the signal OUTPUT BITSTREAM may comprise information about a difference between the motion measured by the motion sensor module 214 and correction(s) made by the OIS module 218. The residual motion information may be used by the module 106 to further improve camera motion compensation during playback or re-encoding.

Figure 6:
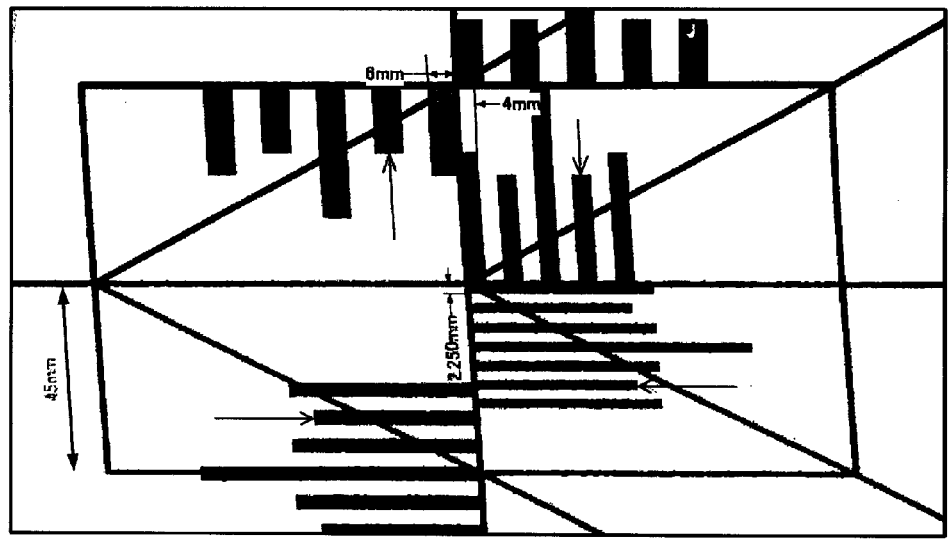
FIG. 6 is an example illustrating a rolling shutter effect on an image.

Referring to FIG. 6, a diagram is shown illustrating a an effect of hand motion on an image acquired with a CMOS sensor. When the image sensor 112 (212) is implemented as a CMOS sensor, the exposure time of each line is generally offset with respect to the previous line. The offset occurs because lines are exposed and read in sequence, which is generally referred to as a "rolling shutter" effect. Starting at about one-eighth of the frame time, the camera starts moving down and to the left. The camera motion may be observed as lines curving to the right, and the lines becoming denser vertically. Also, more vertical area is covered, since the camera is panned down during image capture.

Figure 7:
FIG. 7 is a diagram illustrating an example of an ideal stabilized image.

In a camera that uses OIS, the motion sensor information may be used to move the lens 110 (210) or the image sensor 112 (212) in order to reduce or eliminate the apparent motion caused by, for example, camera shake. In a camera without OIS, the velocity information recorded by the motion sensor (s) 114 (214) may be used for purposes including rolling shutter correction and Electronic Image Stabilization (EIS). Rolling shutter correction generally refers to compensation of geometric distortion (e.g., illustrated in FIG. 6). Geometric distortion caused by horizontal and vertical motion may be compensated horizontally by offsetting each line according to the horizontal velocity, and vertically by changing the line spacing according to the vertical velocity. For Electronic Image Stabilization the velocity may be integrated over a frame time, which becomes the offset from one frame to the next. By changing the horizontal and vertical offsets accordingly, the effect of the hand motion may be stabilized. Referring to FIG. 7, an example is shown illustrating an ideal result of applying the image stabilization techniques described herein to the image of FIG. 6.

Figure 8:
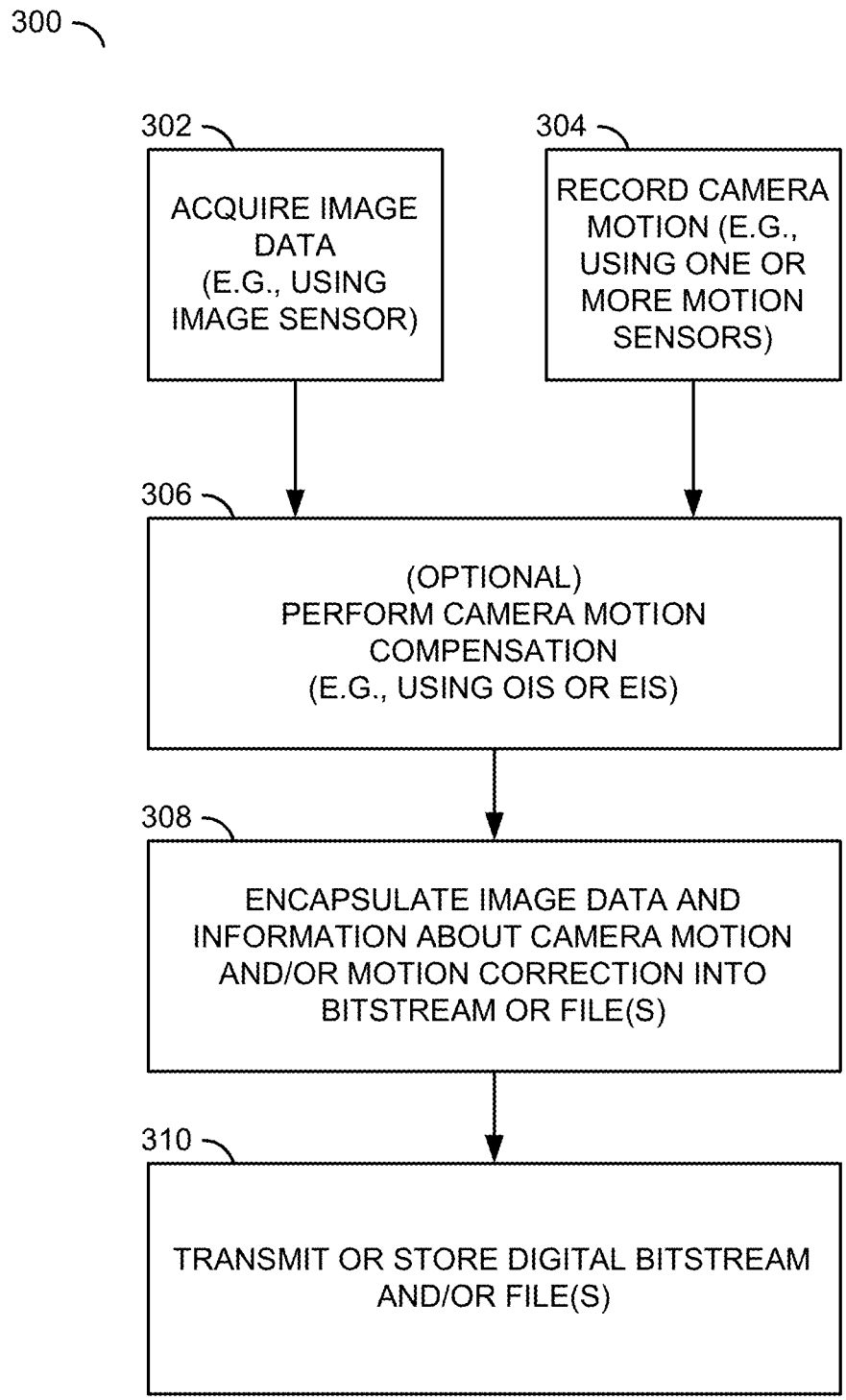
FIG. 8 is a flow diagram illustrating an example process for generating a bitstream in accordance with the present invention.

Referring to FIG. 8, a flow diagram is shown illustrating an example method 300 for generating a bitstream or files in accordance with the present invention. The method 300 generally comprises a step (or block) 302, a step (or block) 304, a step (or block) 306, a step (or block) 308, and a step (or block) 310. The method (or process) 300 may be implemented by the various modules in the cameras 102 and 200.

In step 302, image data is acquired using an image sensor. In the step 304, camera motion information is recorded using one or more motion sensors. The steps 302 and 304 are generally performed concurrently (or simultaneously) so that the recorded camera motion information is relevant to the image data acquired. In the step 306, the motion information recorded from the one or more motion sensors may be used to perform camera motion compensation on the acquired image data. The step 306 may be optional. In the step 308, the acquired image data (either uncorrected or corrected) and information about the motion of the camera may be encapsulated into a digital bitstream or one or more files. The information about the motion of the camera may include the raw motion information recorded from the one or more motion sensors and/or residual motion information describing camera motion not corrected by the camera. The image data and/or motion information may be encoded (compressed) using one or more standard or proprietary encoding/compression schemes. In the step 310, the bitstream and/or file(s) may be transmitted (e.g., via a computer readable transmission medium) and/or stored (e.g., in a computer readable storage medium).

Figure 9:
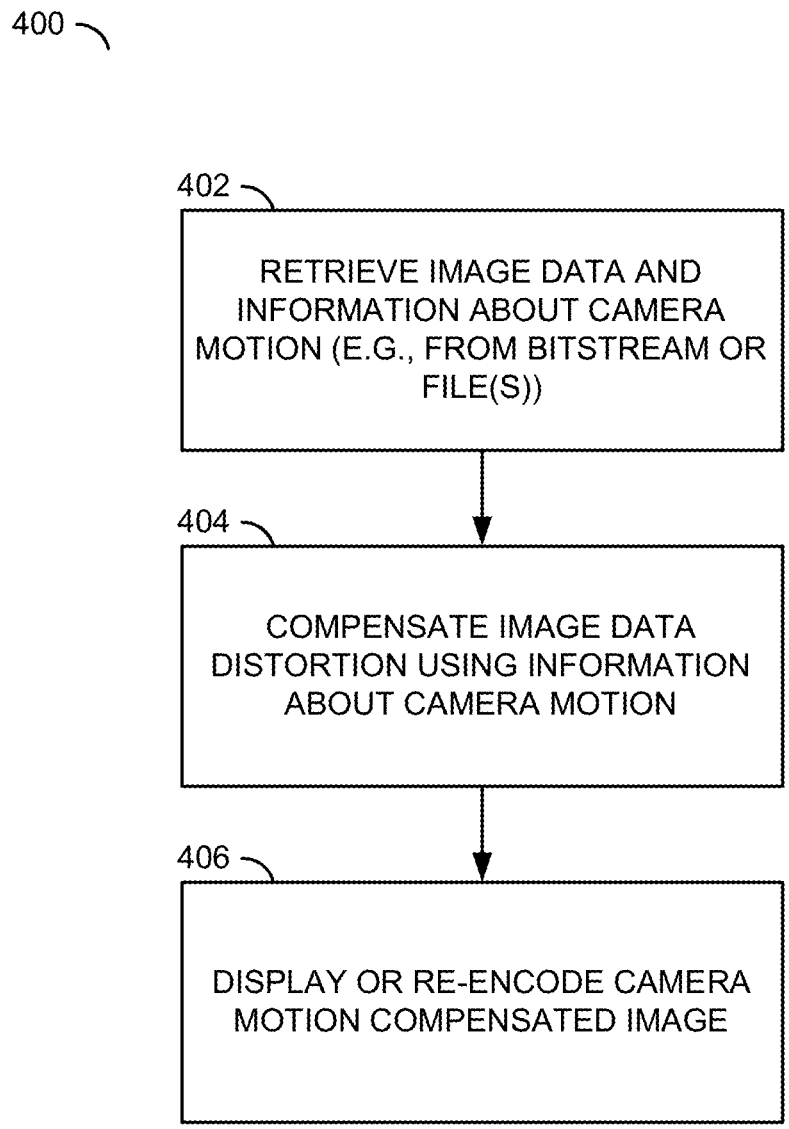
FIG. 9 is a flow diagram illustrating an example playback/re-encoding process using a bitstream in accordance with the present invention.

Referring to FIG. 9, a flow diagram is shown illustrating an example process 400 for playback/re-encoding using a bitstream or files in accordance with the present invention. The method 400 may comprise a step (or block) 402, a step (or block) 404, and a step (or block) 406. The method (or process) 400 may be implemented by the playback/editing/re-encoding module 106.

In step 402, image data and information about the motion of the camera may be retrieved from, for example, a digital bitstream or a computer readable storage medium. In step 404, the information about the motion of the camera may be used to correct distortion in the image data. In one example, the information about the camera motion may be used to determine a horizontal and a vertical velocity of the camera motion during acquisition of the image data. Geometric distortion caused by the horizontal and the vertical motion of the camera during the accusation of the image data may then be compensated. For example, the geometric distortion may be compensated horizontally by offsetting each line according to the horizontal velocity, and vertically by changing the line spacing according to the vertical velocity. For Electronic Image Stabilization the velocity may be integrated over a frame time, which becomes the offset from one frame to the next. By changing the horizontal and vertical offsets accordingly, the effect of the hand motion may be stabilized. In the step 406, the camera motion compensated image data may be displayed and/or re-encoded.

The functions performed by the diagrams of FIGS. 3-9 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As used herein, the term "simultaneously" is meant to describe events that share some common time period, but the term is not meant to be limited to events that begin at the same point in time, end at the same point in time, or have the same duration. The terms "module" and "unit" as used herein are meant to generally refer to one or more devices that may operate together to perform a particular function, but the terms are not meant to limit the one or more devices to being located or integrated into single discrete circuits or blocks.

As would be apparent to those skilled in the relevant art(s), the signals illustrated in FIGS. 3, 4, and 5 represent logical data flows. The logical data flows are generally representative of physical data transferred between the respective blocks by, for example, address, data, and control signals and/or busses. The systems 100 and 100' represented by the diagrams in FIGS. 3 and 4 may be implemented in hardware, software or a combination of hardware and software according to the teachings of the present disclosure, as would be apparent to those skilled in the relevant art(s).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   an interface circuit configured to retrieve (i) image data and (ii) information about camera motion, wherein said information about said camera motion is either encapsulated within a bitstream carrying said image data or stored in a first file associated with a second file containing said image data; and
   a motion compensation circuit configured to perform camera motion compensation on said image data using said information about said camera motion, wherein said motion compensation circuit is enabled to alter motion compensation performed on a current frame based on said information about said camera motion from a future frame.

2. The apparatus according to claim 1, wherein said motion compensation circuit uses said information about said camera motion to improve playback quality.

3. The apparatus according to claim 1, wherein said motion compensation circuit uses said information about said camera motion to improve crop window placement.

4. The apparatus according to claim 1, wherein said motion compensation circuit uses said information about said camera motion to improve rolling shutter related distortion.

5. The apparatus according to claim 1, wherein said information about said camera motion comprises a plurality of motion samples from one or more motion sensors of a camera.

6. The apparatus according to claim 5, wherein said plurality of motion samples is recorded while capturing said image data with said camera.

7. The apparatus according to claim 5, wherein said information about said camera motion comprises original motion samples recorded from said one or more motion sensors.

8. The apparatus according to claim 5, wherein said information about said camera motion comprises corrections made by said camera during acquisition of said image data.

9. The apparatus according to claim 5, wherein said information about said camera motion comprises residual motion information recorded from said one or more motion sensors and corrections made by said camera prior to transferring or storing said image data.

10. The apparatus according to claim 1, wherein said information about said camera motion comprises one or more samples from gyroscopic sensors, inertial sensors, or both gyroscopic and inertial sensors.

11. The apparatus according to claim 1, wherein said information about said camera motion for a respective frame is encapsulated with the respective frame.

12. The apparatus according to claim 1, wherein said information about said camera motion for a respective frame is encapsulated with a frame acquired one or more frame times later than the respective frame.

13. The apparatus according to claim 1, wherein said motion compensation circuit is separate from a camera that captured said image data and said information about said camera motion.

14. The apparatus according to claim 13, wherein said apparatus comprises a playback device, a video editing system, or a transcoder.

15. The apparatus according to claim 1, wherein said motion compensation circuit is integrated with a camera that captured said image data and said information about said camera motion.

16. The apparatus according to claim 1, wherein said information about said camera motion comprises horizontal, vertical, or horizontal and vertical motion samples.

17. The apparatus according to claim 1, wherein said information about said camera motion comprises at least one of angular motion information and linear motion information.

18. The apparatus according to claim 1, wherein said information about said camera motion encapsulated within said bitstream carrying said image data or stored in said first file comprises:
   a first field comprising all or a subset of horizontal and vertical motion samples acquired during a frame time;

a second field comprising crop window parameters when applicable;
a third field comprising residual motion information;
a fourth field comprising exposure time; and
a fifth field comprising a focal distance of a lens of the camera whose motion the information is about.

19. The apparatus according to claim 1, wherein said camera motion compensation further comprises correction for a slow drift in a zero point of a gyroscopic sensor based upon detection of gyroscopic sensor parameter drift.

* * * * *